US011314348B2

(12) United States Patent
Chi et al.

(10) Patent No.: US 11,314,348 B2
(45) Date of Patent: Apr. 26, 2022

(54) TOUCH PANEL

(71) Applicant: Au Optronics Corporation, Hsinchu (TW)

(72) Inventors: Yu-Min Chi, Hsinchu (TW); Sung-Yu Su, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/435,585

(22) Filed: Jun. 10, 2019

(65) Prior Publication Data
US 2020/0073499 A1    Mar. 5, 2020

(30) Foreign Application Priority Data

Sep. 4, 2018   (TW) ................................ 107131040

(51) Int. Cl.
*G02F 1/1368*    (2006.01)
*G06F 3/041*     (2006.01)
(Continued)

(52) U.S. Cl.
CPC .......... *G06F 3/0412* (2013.01); *G02F 1/1368* (2013.01); *G02F 1/13338* (2013.01); *G02F 1/134363* (2013.01); *G02F 1/136286* (2013.01); *G02F 1/13606* (2021.01); *G02F 1/13685* (2021.01); *G02F 2201/121* (2013.01); *G02F 2201/123* (2013.01)

(58) Field of Classification Search
CPC .......... G02F 1/13338; G02F 1/133512; G02F 1/134336; G02F 1/13439; G02F 1/136286; G06F 3/044; G06F 3/0416; G06F 3/047; G06F 3/0412
See application file for complete search history.

(56) References Cited

U.S. PATENT DOCUMENTS 9,529,469 B2   12/2016  Liu et al.
9,933,905 B2    4/2018  Xiong et al.
(Continued)

FOREIGN PATENT DOCUMENTS

CN   104102402   10/2014
CN   104503633    4/2015
(Continued)

*Primary Examiner* — Ke Xiao
*Assistant Examiner* — James S Nokham
(74) *Attorney, Agent, or Firm* — JCIPRNET

(57) ABSTRACT

A touch panel includes a substrate, scan lines, data lines, sub-pixels, a first conductive line, a second conductive line, and a conductive layer. The sub-pixels are arranged in columns along a first direction and arranged in rows along a second direction. Each of the sub-pixels includes an active element and a pixel electrode electrically connected with the active element. The active element is electrically connected with a corresponding scan line and a corresponding data line. The conductive layer overlaps the sub-pixels. The conductive layer includes a first electrode and a second electrode. The first electrode is electrically connected with the first conductive line. The second electrode is electrically connected with the second conductive line. The second electrode is separated from the first electrode. One of the first electrode and the second electrode is a touch electrode, and another one is a common electrode.

15 Claims, 8 Drawing Sheets

(51) Int. Cl.
   *G02F 1/1333* (2006.01)
   *G02F 1/1343* (2006.01)
   *G02F 1/1362* (2006.01)
   *G02F 1/136* (2006.01)

(56) References Cited

U.S. PATENT DOCUMENTS

| | | | |
|---|---|---|---|
| 10,013,086 B2 | 7/2018 | Yang et al. | |
| 2013/0106441 A1* | 5/2013 | Yilmaz | G06F 3/0443 324/658 |
| 2014/0210774 A1* | 7/2014 | Kim | G06F 3/044 345/174 |
| 2014/0247402 A1 | 9/2014 | Chou et al. | |
| 2014/0354301 A1* | 12/2014 | Trend | G06F 3/0448 324/658 |
| 2015/0378390 A1 | 12/2015 | Liu et al. | |
| 2016/0011703 A1* | 1/2016 | Park | G06F 3/047 345/174 |
| 2016/0253023 A1* | 9/2016 | Aoyama | G06F 3/0416 345/174 |
| 2016/0349889 A1* | 12/2016 | Yang | G06F 3/0412 |
| 2017/0003792 A1* | 1/2017 | Berget | G06F 3/0416 |
| 2017/0031488 A1* | 2/2017 | Shim | G02F 1/13338 |
| 2017/0147119 A1* | 5/2017 | Hotelling | G02F 1/133528 |
| 2017/0192508 A1* | 7/2017 | Lim | G06F 3/0412 |
| 2017/0192557 A1* | 7/2017 | Xiong | G06F 3/0416 |
| 2018/0011577 A1* | 1/2018 | Lee | G06F 3/0443 |
| 2018/0188863 A1* | 7/2018 | Yi | G06F 3/04184 |

FOREIGN PATENT DOCUMENTS

| | | |
|---|---|---|
| CN | 105573554 | 5/2016 |
| CN | 107357467 | 11/2017 |
| TW | 201435669 | 9/2014 |

* cited by examiner

TOUCH PANEL

CROSS-REFERENCE TO RELATED APPLICATION

This application claims the priority benefit of Taiwan application serial no. 107131040, filed on Sep. 4, 2018. The entirety of the above-mentioned patent application is hereby incorporated by reference herein and made a part of this specification.

BACKGROUND

Field of the Disclosure

The disclosure relates to a touch panel, and more particularly to a touch panel including a touch electrode and a common electrode.

Description of Related Art

With the advancement of technology, touch devices are increasingly launched to the market, and various related technologies have emerged endlessly. Many electronic products on the market, such as mobile phones, tablet PCs, watches, etc. are often designed by combining touch devices with display panels. At present, many manufacturers have proposed a technology for integrating a touch device into a display panel. As compared with attaching the touch device to the outside of the display panel, integrating the touch device into the display panel can reduce the overall thickness of the product. However, integrating the touch electrodes into the display panel tends to cause excessive parasitic capacitance on the touch electrodes, which affects the sensitivity of touch detection.

SUMMARY OF THE DISCLOSURE

The disclosure provides a touch device, capable of improving the problem of excessive parasitic capacitance on the touch electrode, thereby improving the sensitivity of touch detection.

A touch panel of the disclosure includes a substrate, a plurality of scan lines, a plurality of data lines, a plurality of sub-pixels, a first conductive line, a second conductive line, and a conductive layer. The scan lines, the data lines, and the sub-pixels are disposed on the substrate. The sub-pixels are arranged in a plurality of columns along the first direction and arranged in a plurality of rows along the second direction. Each of the sub-pixels includes an active element and a pixel electrode electrically connected to the active element. The active element is electrically connected to the corresponding scan line and the corresponding data line. The first conductive line and the second conductive line are disposed on the substrate. The conductive layer overlaps the sub-pixel. The conductive layer includes a first electrode and a second electrode. The first electrode is electrically connected to the first conductive line. The second electrode is electrically connected to the second conductive line. The second electrode is separated from the first electrode. One of the first electrode and the second electrode is a touch electrode, and the other is a common electrode.

In order to make the aforementioned features and advantages of the disclosure more comprehensible, embodiments accompanying figures are described in detail below.

DESCRIPTION OF EMBODIMENTS

Figure 1A:
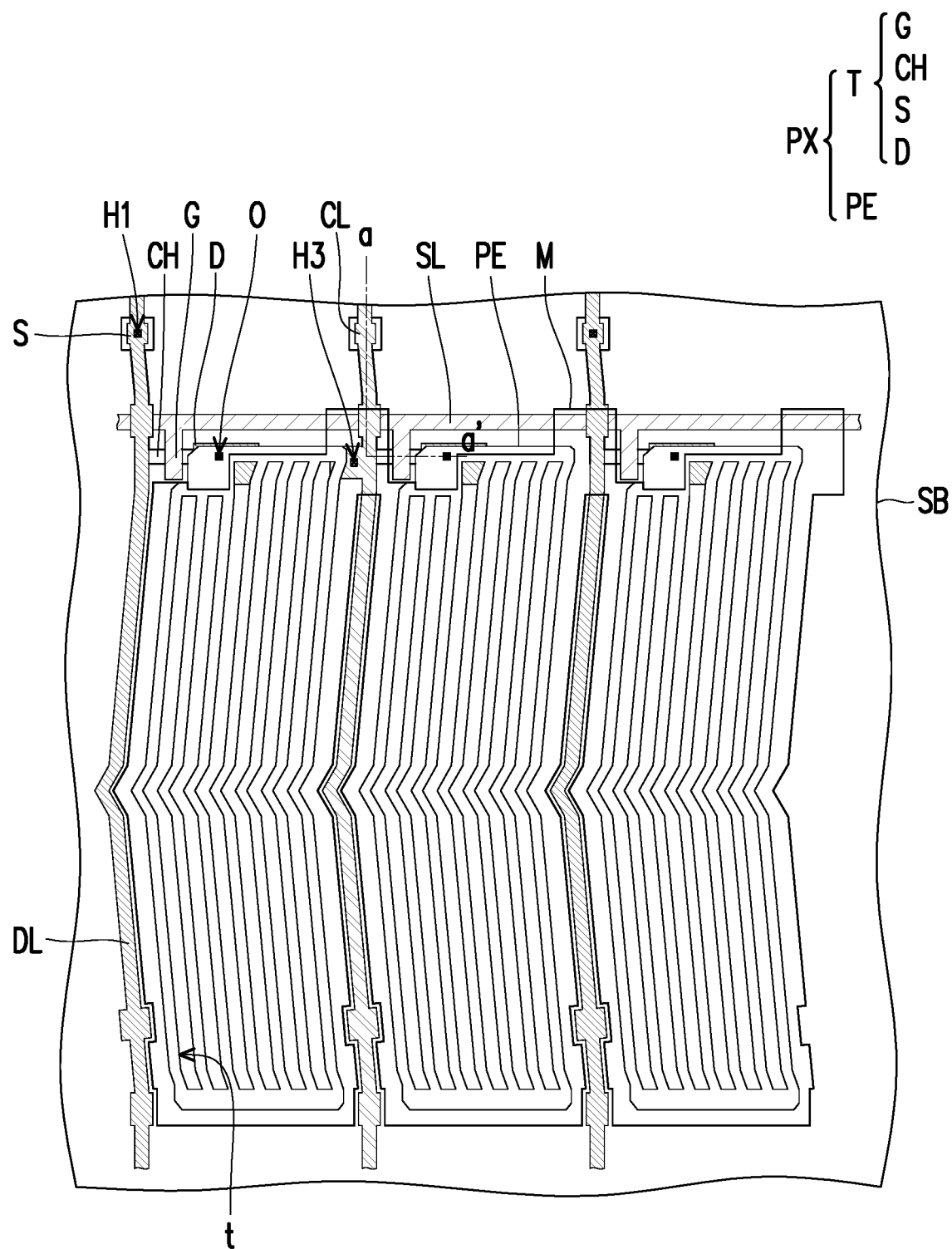
FIG. 1A is a schematic top view of a touch device according to an embodiment of the disclosure.
Figure 1B:
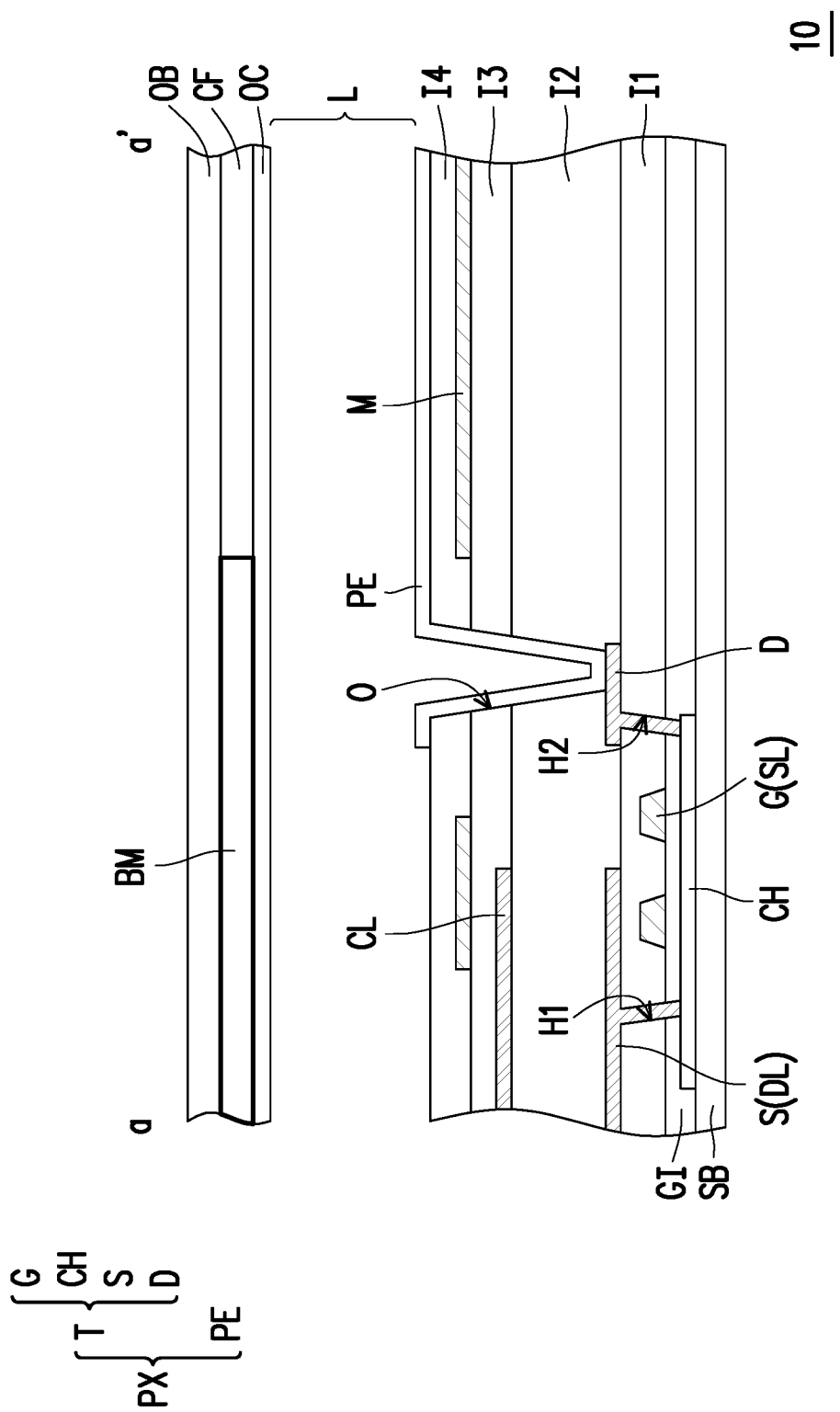
FIG. 1B is a schematic cross-sectional view of FIG. 1A taken along sectional line aa'.

FIG. 1A is a schematic top view of a touch device according to an embodiment of the disclosure. FIG. 1B is a schematic cross-sectional view of FIG. 1A taken along sectional line aa'.

Referring to FIG. 1A and FIG. 1B, a touch panel 10 includes a substrate SB, a plurality of scan lines SL, a plurality of data lines DL, a plurality of sub-pixels PX, a conductive line CL, and a conductive layer M. In the embodiment, the touch panel 10 further includes a carrier OB, a filter element CF, a black matrix BM, a protective layer OC, and a display medium layer L.

The scan lines SL, the data lines DL, the sub-pixels PX, the conductive line CL, and the conductive layer M are disposed on the substrate SB. Each of the sub-pixels PX includes an active element T and a pixel electrode PE electrically connected to the active element T. The active element T is electrically connected to the corresponding scan line SL and the corresponding data line DL.

In the embodiment, the active element T includes a channel layer CH, a gate G, a source S, and a drain D. The gate G is electrically connected to the scan line SL. The gate G overlaps the channel layer CH, and a gate insulating layer GI is interposed between the gate G and the channel layer CH. The first insulating layer I1 covers the gate G, and the first insulating layer I1 is interposed between the scan line SL and the data line DL. The source S and the drain D are disposed on the first insulating layer I1 and are electrically connected to the channel layer CH through the openings H1 and H2, respectively. The openings H1 and H2 at least penetrate the first insulating layer I1. In the embodiment, the openings H1 and H2 penetrate the gate insulating layer GI and the first insulating layer I1. The source S is electrically connected to the data line DL.

In the embodiment, although the active element T is exemplified as a top gate type thin film transistor, the disclosure is not limited thereto. In other embodiments, the active element T may also be a bottom gate type or other type of thin film transistor.

The second insulating layer I2 covers the source S and the drain D. The conductive line CL is disposed on the second insulating layer I2. In the embodiment, the conductive line CL is overlapped with the data line DL, thereby avoiding the loss of the aperture ratio. The conductive line CL is, for example, a touch electrode conductive line or a common electrode conductive line. The third insulating layer I3 is disposed on the conductive line CL and the second insulating layer I2.

The conductive layer M is disposed on the third insulating layer I3. The conductive layer M includes, for example, a touch electrode and a common electrode. The conductive layer M is electrically connected to the conductive line CL. In the embodiment, the conductive layer M is electrically connected to the conductive line CL through the opening H3, and the opening H3 penetrates through the third insulating layer I3. The fourth insulating layer I4 covers the conductive layer M. The pixel electrode PE covers the fourth insulating layer I4 and is separated from the conductive layer M. The pixel electrode PE is electrically connected to the drain D of the active element T through the opening O, and the opening O penetrates through the second insulating layer I2, the third insulating layer I3, and the fourth insulating layer I4. The conductive layer M overlaps the pixel electrode PE of the sub-pixel PX.

In the embodiment, although it is exemplified that the conductive layer M is disposed between the pixel electrode PE and the substrate SB, and the pixel electrode PE has a plurality of slits t, the disclosure is not limited thereto. In other embodiments, the pixel electrode PE is disposed between the conductive layer M and the substrate SB, and the conductive layer M has a plurality of slits t.

The carrier OB is disposed facing the substrate SB, and the display medium layer L is interposed between the carrier OB and the substrate SB. The display medium layer L includes, for example, liquid crystal molecules.

The filter element CF and the black matrix BM are disposed on the carrier OB. The filter element CF includes, for example, a red filter pattern, a green filter pattern, and a blue filter pattern. In some embodiments, the filter element CF may also include filter patterns of other colors. In some embodiments, the black matrix BM is disposed between filter patterns of different colors. The black matrix BM overlaps the scan line SL, the data line DL, the active element T, and the conductive line CL. The protective layer OC covers the filter element CF and the black matrix BM.

In the embodiment, although it is exemplified that the black matrix BM is disposed on the carrier OB, the disclosure is not limited thereto. In other embodiments, the black matrix BM is disposed on the substrate SB and constitutes a black matrix on array (BOA) structure.

In the embodiment, although it is exemplified that the filter element CF is disposed on the carrier OB, the disclosure is not limited thereto. In other embodiments, the filter element CF is disposed on the substrate SB and constitutes a color filter on array (COA) structure.

Figure 2:
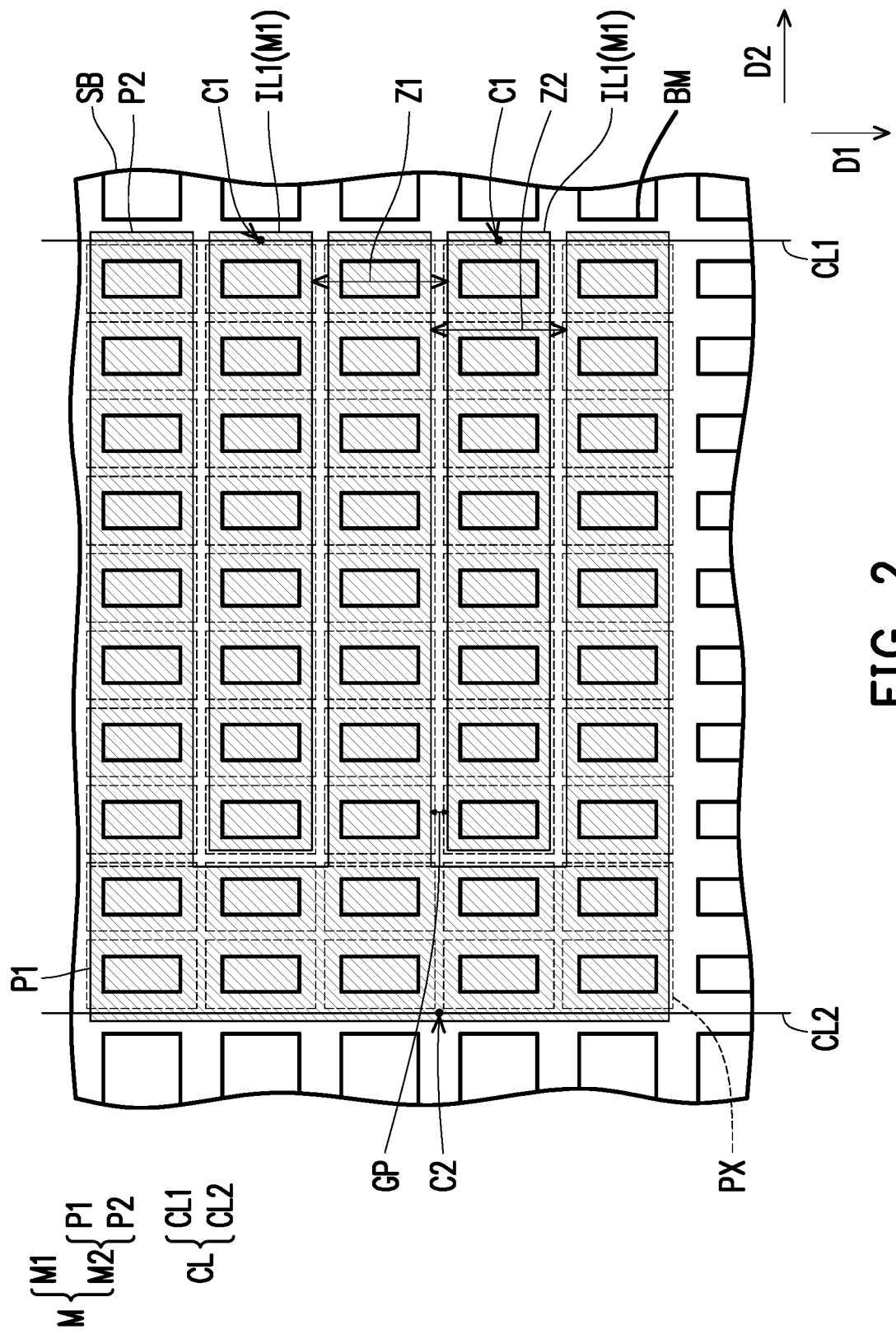
FIG. 2 is a schematic top view of a touch device according to an embodiment of the disclosure.

FIG. 2 is a schematic top view of a touch device according to an embodiment of the disclosure. It is to be explained that, the embodiment of FIG. 2 has adopted component notations and part of the contents from the embodiments of FIG. 1A and FIG. 1B, wherein the same notations are used for representing the same or similar components, and descriptions of the same technical contents are omitted. The descriptions regarding the omitted part may be referred to the previous embodiments, and thus are not repeated herein.

For simplicity of description, FIG. 2 only shows the substrate SB, the plurality of sub-pixels PX, the conductive line CL, the conductive layer M, and the black matrix BM of the touch panel 20. For other omitted components, reference may be made to FIG. 1A and FIG. 1B.

Referring to FIG. 2, the sub-pixels PX are arranged in a plurality of columns along the first direction D1, and are arranged in a plurality of rows along the second direction D2. In this embodiment, it is exemplified that the data lines extend along the first direction D1, and the scan lines extend along the second direction D2, but the disclosure is not limited thereto. In other embodiments, the data lines extend along the second direction D2 and the scan lines extend along the first direction D1. The scan lines and the data lines overlap, for example, the black matrix BM. For ease of explanation, the scan lines and the data lines are not depicted in FIG. 2.

The conductive line CL includes a first conductive line CL1 and a second conductive line CL2. The first conductive line CL1 and the second conductive line CL2 are disposed on the substrate SB.

The conductive layer M includes a first electrode M1 and a second electrode M2. The first electrode M1 and the second electrode M2 are disposed on the same surface. For example, the first electrode M1 and the second electrode M2 are disposed between the third insulating layer I3 and the fourth insulating layer I4, but the disclosure is not limited thereto, and the first electrode M1 and the second electrode M2 may also be dispose between other insulating layers. The first electrode M1 is electrically connected to the first conductive line CL1 through the connection structure C1. The second electrode M2 is electrically connected to the second conductive line CL2 through the connection structure C2. The second electrode M2 is structurally separated from the first electrode M1. The connection structure C1 and the connection structure C2 are, for example, vias. One of the first electrode M1 and the second electrode M2 is a touch electrode, and the other is a common electrode. In this embodiment, the first electrode M1 is a touch electrode, the first conductive line CL1 is a touch electrode conductive line, the second electrode M2 is a common electrode, and the second conductive line CL2 is a common electrode conductive line, but the disclosure is not limited thereto. In other embodiments, the first electrode M1 is a common electrode, the first conductive line CL1 is a common electrode conductive line, the second electrode M2 is a touch electrode, and the second conductive line CL2 is a touch electrode conductive line.

In some embodiments, the first electrode M1 and the second electrode M2 are the same material layer. For example, the first electrode M1 and the second electrode M2 are formed by the same patterning process. On this occasion, the thicknesses of the first electrode M1 and the second electrode M2 may be the same. The first electrode M1 and the second electrode M2 are, for example, transparent conductive materials. The ratio of the area of the first electrode M1 vertically projected on the substrate SB to the area of the second electrode M2 vertically projected on the substrate SB is 2:8 to 8:2.

In the embodiment, the first electrode M1 includes a plurality of first island electrodes IL1 separated from each other, and the plurality of first island electrodes IL1 are electrically connected to the first conductive line CL1. In this embodiment, it is exemplified that each of the first island electrodes IL1 covers a column of sub-pixels PX, but the disclosure is not limited thereto. In other embodiments, each of the first island electrodes IL1 may cover two or more columns of sub-pixels PX. In other words, the width and shape of the first island electrode IL1 may be adjusted as needed.

In this embodiment, the second electrode M2 includes a connecting portion P1 extending along the first direction D1 and a plurality of finger portions P2 extending along the second direction D2. The finger portion P2 is connected to the connecting portion P1, and the first island electrode IL1 and the finger portion P2 are alternately arranged along the first direction D1. In the embodiment, it is exemplified that two rows of sub-pixels PX are covered by each of the connecting portions P1, but the disclosure is not limited thereto. In other embodiments, each of the connecting portions P1 may cover one or three or more rows of sub-pixels PX. In this embodiment, it is exemplified that each of the finger portions P2 covers a column of sub-pixels PX, but the disclosure is not limited thereto. In other embodiments, each of the finger portions P2 may cover two or more columns of sub-pixels PX. In other words, the width and shape of the connecting portion P1 and the finger portion P2 may be adjusted as needed.

In some embodiments, the spacing Z1 between two adjacent first island electrodes IL1 is, for example, between 31.7 µm and 1 mm, and the spacing Z2 between two adjacent finger portions P2 is, for example, between 31.7 µm and 1 mm. Therefore, the touch panel 20 can accurately detect the touch position of the user.

In the embodiment, the first island electrode IL1 and the finger portion P2 of the second electrode M2 overlap the first conductive line CL1, and the connecting portion P1 of the second electrode M2 overlaps the second conductive line CL2.

In the embodiment, the black matrix BM overlaps the data lines DL and the scan lines SL. The second electrode M2 and the first electrode M1 are spaced apart by at least one gap GP, and the black matrix BM overlaps the gap GP. In this manner, it is possible to prevent the gap GP between the second electrode M2 and the first electrode M1 from affecting the display quality.

Figure 3:
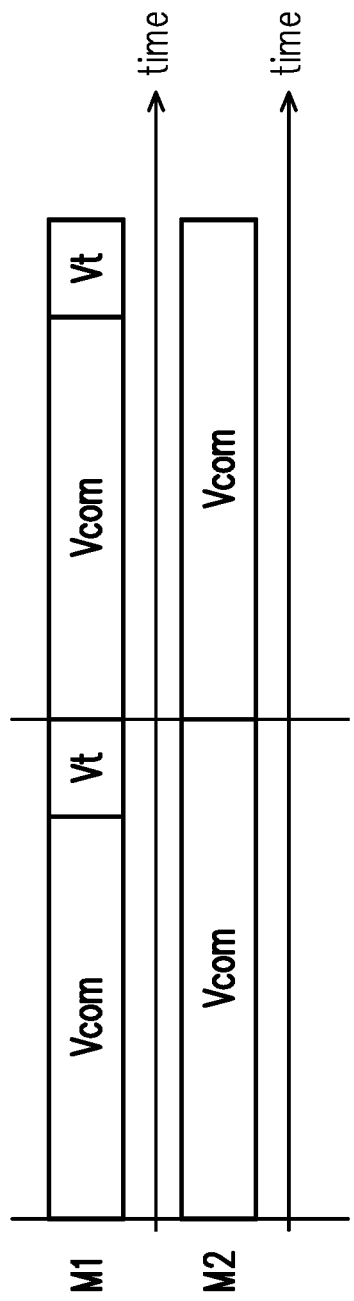
FIG. 3 is a schematic diagram illustrating an operation method of a first electrode and a second electrode in a touch device according to an embodiment of the disclosure.

FIG. 3 is a schematic diagram illustrating an operation method of a first electrode and a second electrode in a touch device according to an embodiment of the disclosure. For example, FIG. 3 is a schematic view illustrating an operation method of applying a voltage to the first electrode M1 and the second electrode M2 in FIG. 2.

Referring to FIG. 2 and FIG. 3, in the embodiment, the first electrode M1 is a touch electrode, and the second electrode M2 is a common electrode. The first electrode M1 is switched into the common voltage Vcom or the touch voltage Vt as time goes by. In other words, the first electrode M1 not only can provide the touch signal required for the touch function, but also can provide the common voltage signal required for the display function. A common voltage Vcom is applied to the second electrode M2, and the second electrode M2 can provide a common voltage signal required for the display function.

Since both the first electrode M1 and the second electrode M2 can provide a common voltage signal, the touch panel 20 can provide a touch function while maintaining the overall screen display quality.

In some embodiments, the ratio of the time when the touch voltage Vt is applied to the first electrode M1 to the time when the common voltage Vcom is applied to the first electrode M1 is 1:2 to 1:12.

Based on the above, a portion of the conductive layer M of the embodiment serves as a common electrode, and a portion of the conductive layer M serves as a touch electrode. As compared with that the whole conductive layer M is used as a touch electrode, the area of the touch electrode of the embodiment is smaller, so the parasitic capacitance on the touch electrode may be reduced, thereby improving the sensitivity of the touch detection.

Figure 4:
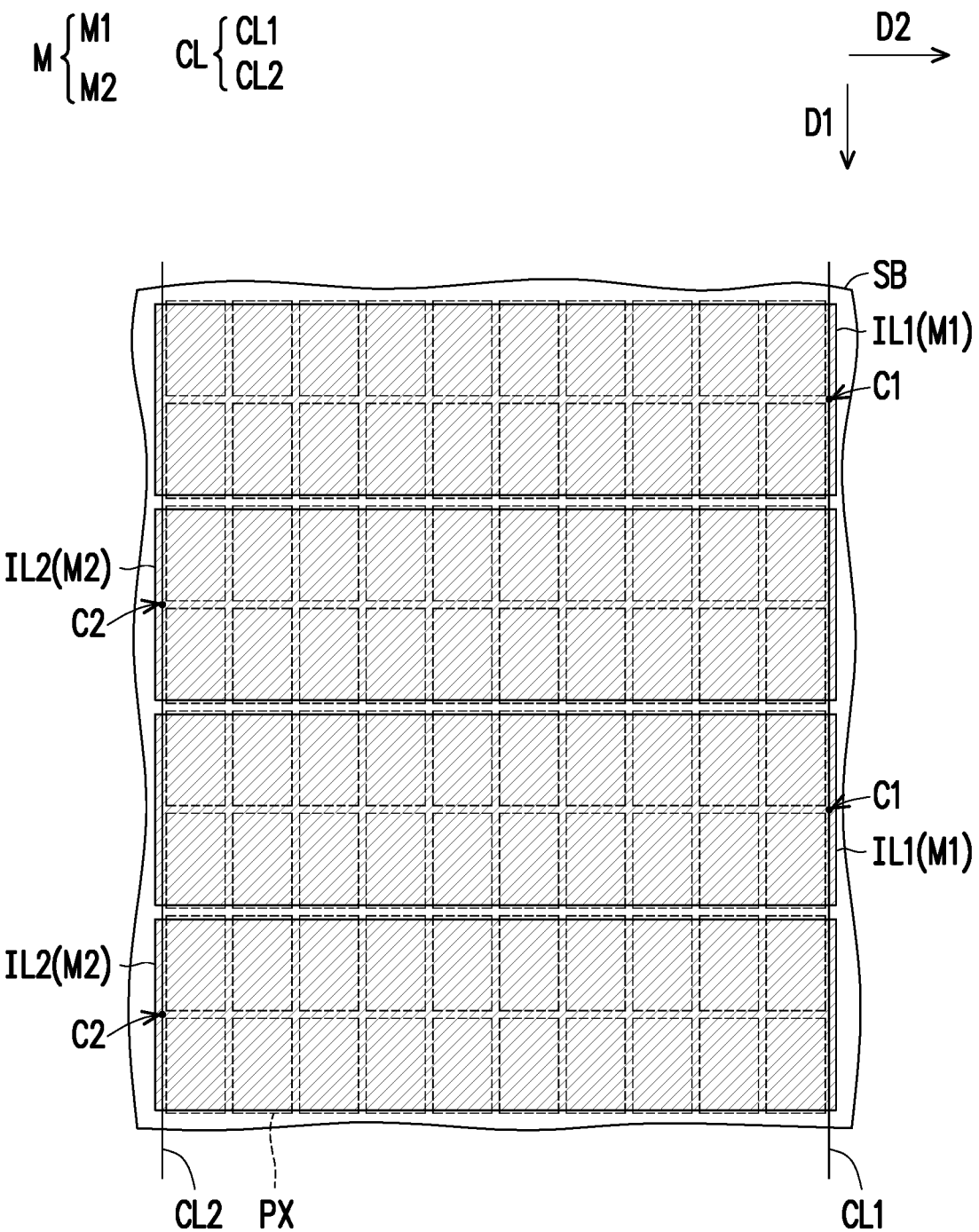
FIG. 4 is a schematic top view of a touch device according to an embodiment of the disclosure.

FIG. 4 is a schematic top view of a touch device according to an embodiment of the disclosure. It is to be explained that, the embodiment of FIG. 4 has adopted component notations and part of the contents from the embodiment of FIG. 2, wherein the same notations are used for representing the same or similar components, and descriptions of the same technical contents are omitted. The descriptions regarding the omitted part may be referred to the previous embodiments, and thus are not repeated herein.

The main difference between the touch panel 30 of FIG. 4 and the touch panel 20 of FIG. 2 is that the shape of the second electrode M2 of the touch panel 30 is different from the shape of the second electrode M2 of the touch panel 20.

Referring to FIG. 4, the first electrode M1 includes a plurality of first island electrodes IL1 separated from each other. The first island electrode IL1 is electrically connected to the first conductive line CL1. In this embodiment, it is exemplified that each of the first island electrodes IL1 covers the two columns of sub-pixels PX, but the disclosure is not limited thereto. In other embodiments, each of the first island electrodes IL1 covers one or three or more columns of sub-pixels PX.

The second electrode M2 includes a plurality of second island electrodes IL2 separated from each other. The second island electrodes IL2 are electrically connected to the second conductive line CL2. In this embodiment, it is exemplified that each of the second island electrodes IL2 covers the two columns of sub-pixels PX, but the disclosure is not limited thereto. In other embodiments, each of the second island electrodes IL2 covers one or three or more columns of sub-pixels PX.

The first island electrode IL1 and the second island electrode IL2 overlap the first conductive line CL1, and the first island electrode IL1 and the second island electrode IL2 overlap the second conductive line CL2.

In the embodiment, the first island electrode IL1 and the second island electrode IL2 are alternately arranged along the first direction D1. The first island electrode IL1 and the second island electrode IL2 are equal in length in the second extending direction D2.

In this embodiment, the first electrode M1 is a touch electrode, the first conductive line CL1 is a touch electrode conductive line, the second electrode M2 is a common electrode, and the second conductive line CL2 is a common electrode conductive line, but the disclosure is not limited thereto.

Based on the above, a portion of the conductive layer M of the embodiment is used as a common electrode, and a portion of the conductive layer M is used as a touch electrode. As compared with that the whole conductive layer M is used as a touch electrode, the area of the touch electrode of the embodiment is smaller, so the parasitic capacitance on the touch electrode may be reduced, thereby improving the sensitivity of the touch detection.

Figure 5:
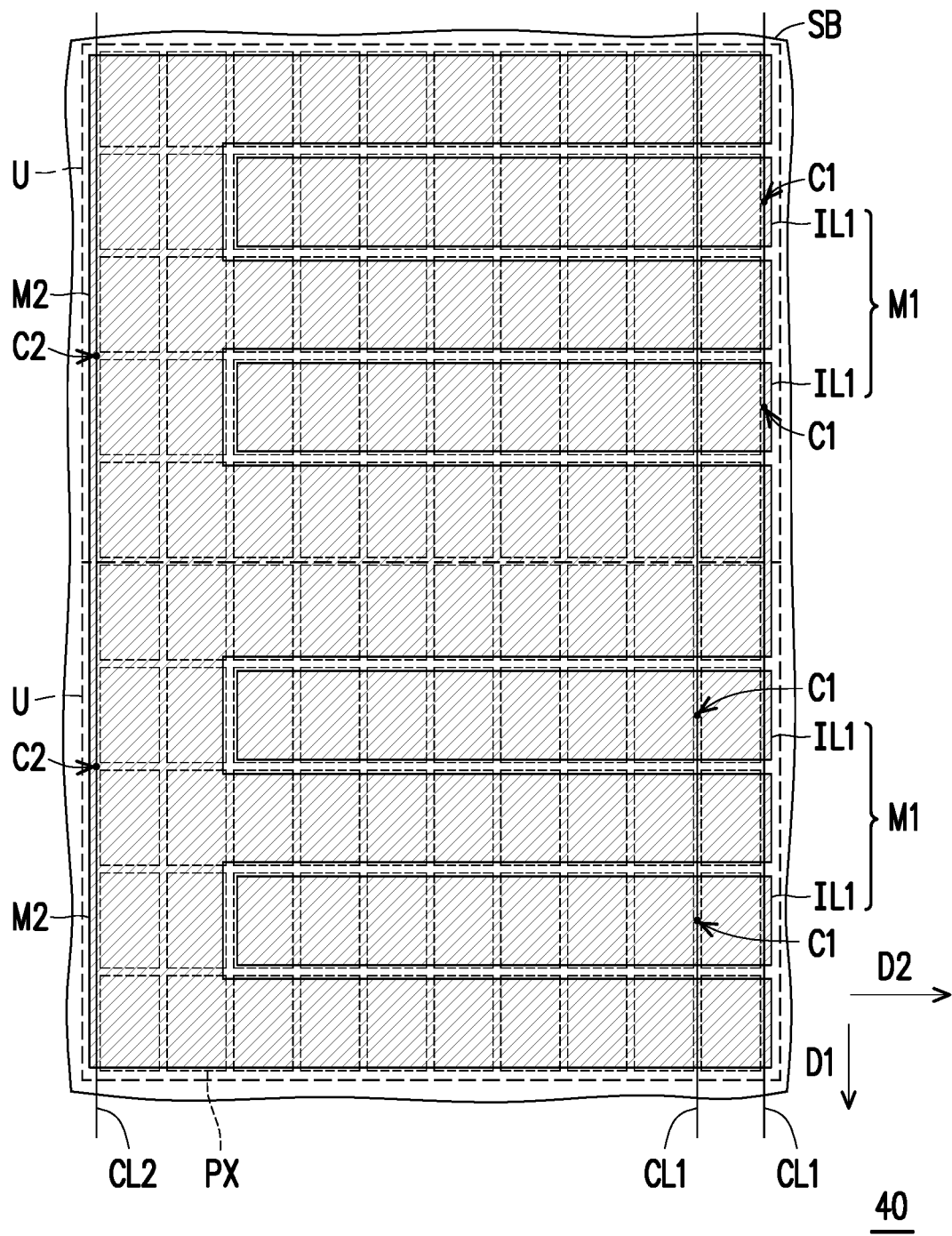
FIG. 5 is a schematic top view of a touch device according to an embodiment of the disclosure.

FIG. 5 is a schematic top view of a touch device according to an embodiment of the disclosure. It is to be explained that, the embodiment of FIG. 5 has adopted component notations and part of the contents from the embodiment of FIG. 2, wherein the same notations are used for representing the same or similar components, and descriptions of the same technical contents are omitted. The descriptions regarding the omitted part may be referred to the previous embodiments, and thus are not repeated herein.

The main difference between the touch panel 40 of FIG. 5 and the touch panel 20 of FIG. 2 is that the touch panel 40 includes a plurality of touch units U.

Referring to FIG. 5, in the embodiment, each of the touch units U includes at least one first electrode M1 and at least one second electrode M2. In this embodiment, one first electrode M1 and one second electrode M2 in each of the touch units U are taken as an example.

The touch panel 40 includes a plurality of first electrodes M1 and a plurality of first conductive lines CL1. The first electrode M1 is a touch electrode, and each of the first electrodes M1 is electrically connected to one corresponding first conductive line CL1. In this embodiment, the first electrode M1 in each of the touch units U is electrically connected to one corresponding first conductive line CL1. For example, each of the first electrodes M1 includes two first island electrodes IL1 and the two first island electrodes IL1 are connected to one first conductive line CL1, but the disclosure is not limited thereto. In other embodiments, each of the first electrodes M1 includes one or three or more first island electrodes IL1 and the one or three or more first island electrodes IL1 are connected to one first conductive line CL1.

The touch panel 40 includes a plurality of second electrodes M2. The second electrode M2 is a common electrode. In this embodiment, the second electrodes M2 of the plurality of touch units U is electrically connected to the same second conductive line CL2. In other words, the plurality of second electrodes M2 are electrically connected to each other.

Based on the above, a portion of the conductive layer M of the embodiment is used as a common electrode, and a portion of the conductive layer M is used as a touch electrode. As compared with that the whole conductive layer M is used as a touch electrode, the area of the touch electrode of the embodiment is smaller, so the parasitic capacitance on the touch electrode may be reduced, thereby improving the sensitivity of the touch detection.

Figure 6A:
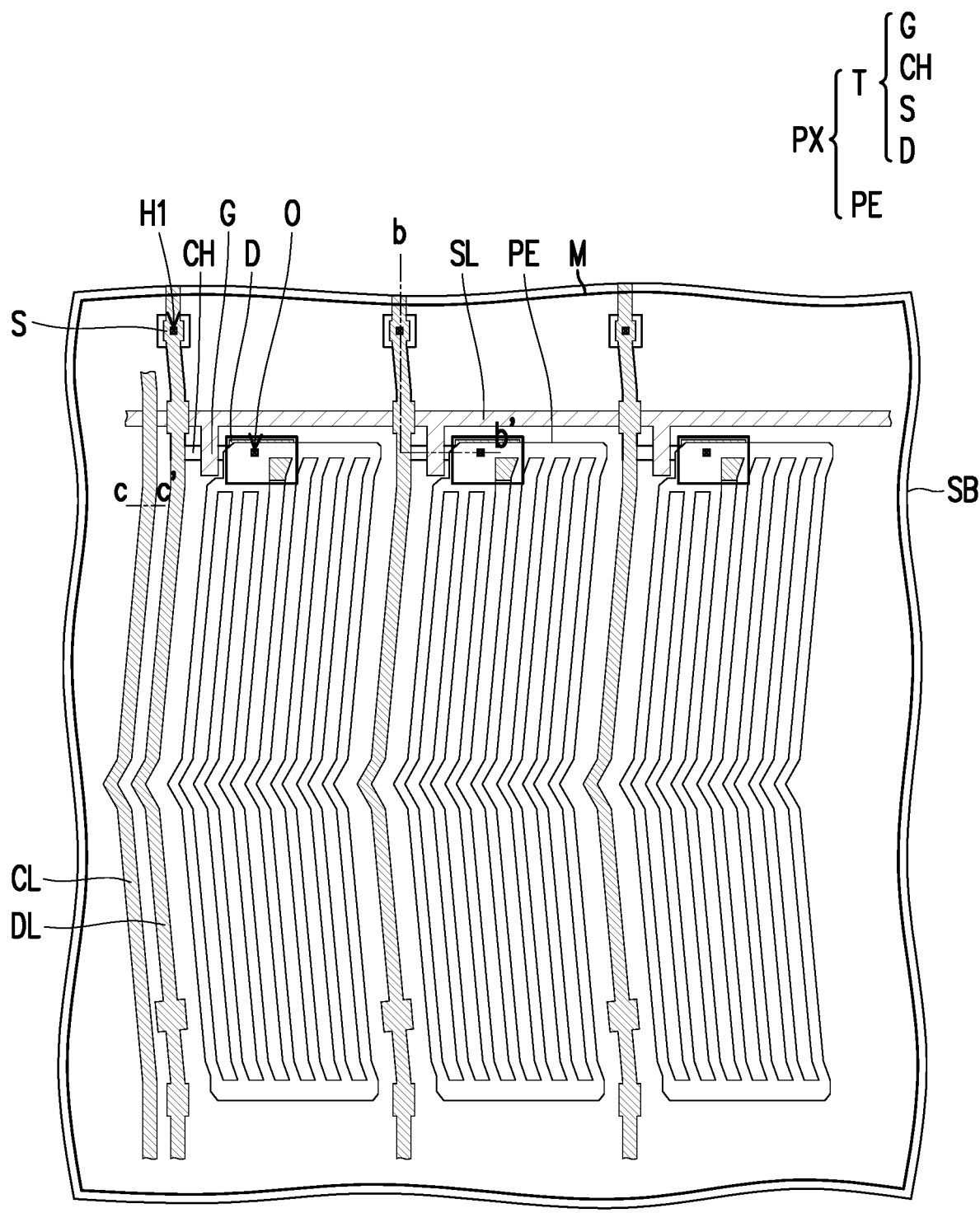
FIG. 6A is a schematic top view of a touch device according to an embodiment of the disclosure.
Figure 6B:
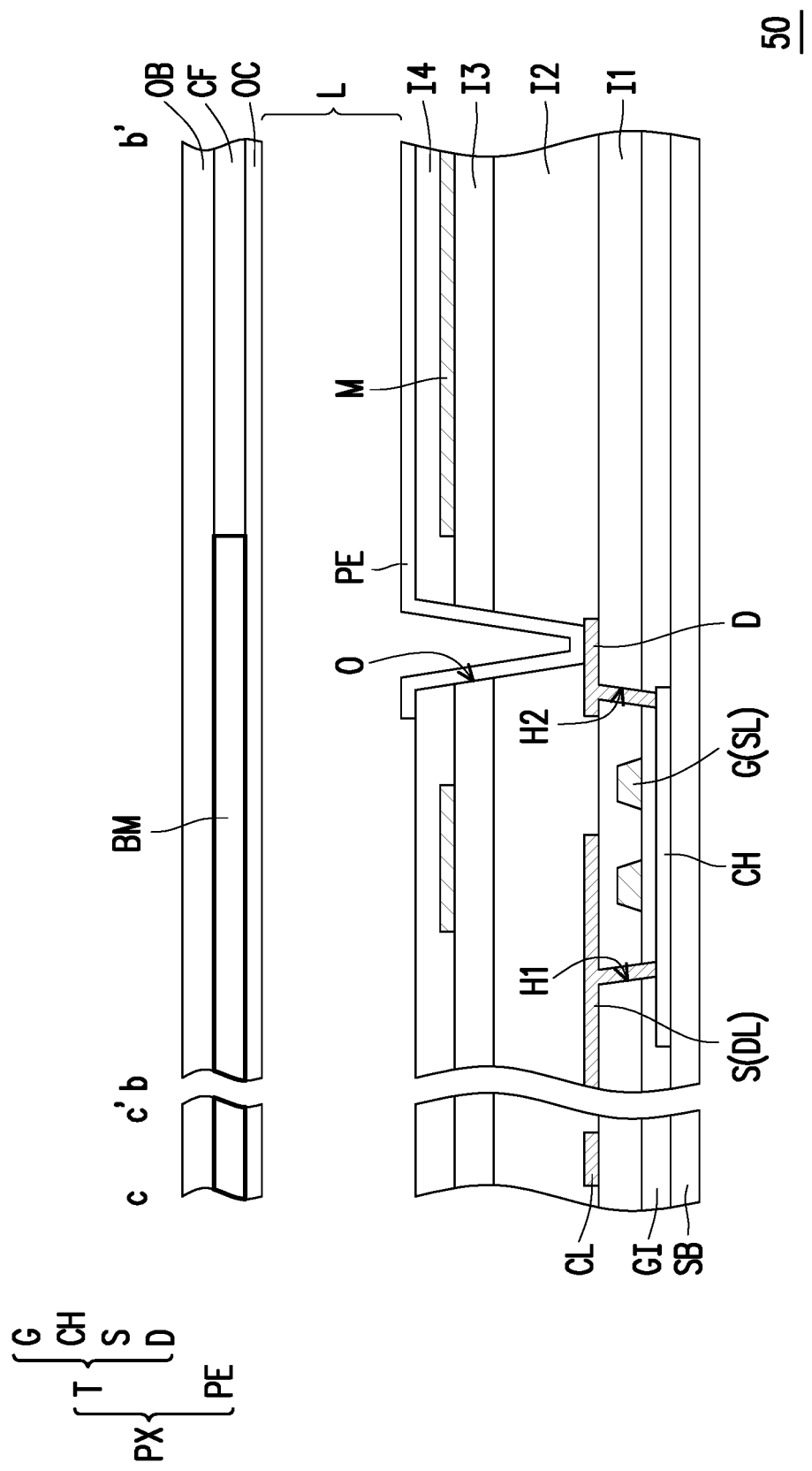
FIG. 6B is a schematic cross-sectional view of FIG. 6A taken along sectional line bb' and sectional line cc'.

FIG. 6A is a schematic top view of a touch device according to an embodiment of the disclosure. FIG. 6B is a schematic cross-sectional view of FIG. 6A taken along sectional line bb' and sectional line cc'. It is to be explained that, the embodiments of FIG. 6A and FIG. 6B have adopted component notations and part of the contents from the embodiments of FIG. 1A and FIG. 1B, wherein the same notations are used for representing the same or similar components, and descriptions of the same technical contents are omitted. The descriptions regarding the omitted part may be referred to the previous embodiments, and thus are not repeated herein.

The main difference between the touch panel 50 of FIG. 6A and FIG. 6B and the touch panel 10 of FIG. 1 is that the conductive line CL of the touch panel 50 and the data line DL are the same material layer.

Referring to FIG. 6A and FIG. 6B, in the embodiment, the conductive line CL and the data line DL may be formed in the same patterning process, thereby saving the number of masks required for manufacturing the touch panel 50. The conductive line CL in this embodiment may be the first conductive line CL1 or the second conductive line CL2 of any of the foregoing embodiments.

In summary, according to at least one embodiment of the disclosure, a portion of the conductive layer is used as a common electrode, and a portion of the conductive layer is used as a touch electrode. As compared with that the whole conductive layer is used as a touch electrode, the area of the touch electrode of the embodiment is smaller, so the parasitic capacitance on the touch electrode may be reduced, thereby improving the sensitivity of the touch detection.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel, comprising:
a substrate;
a plurality of scan lines and a plurality of data lines, disposed on the substrate;
a plurality of sub-pixels, disposed on the substrate, the sub-pixels arranged in a plurality of columns along a first direction, and the sub-pixels arranged in a plurality of rows along a second direction, and each of the sub-pixels comprising:
an active element, electrically connected to a corresponding scan line and a corresponding data line; and
a pixel electrode, electrically connected to the active element;
a first conductive line, disposed on the substrate;
a second conductive line, disposed on the substrate; and
a conductive layer overlapping the sub-pixels, wherein the conductive layer comprises:
a first electrode, electrically connected to the first conductive line; and
a second electrode, electrically connected to the second conductive line, the first electrode and the second electrode are co-planar, and the second electrode separated from the first electrode, wherein the first electrode is a touch electrode, and the second electrode is a common electrode,
wherein the first electrode comprises a plurality of first island electrodes separated from each other, and the plurality of the first island electrodes are electrically connected to the first conductive line,
wherein the second electrode comprises a plurality of second island electrodes separated from each other, and the second island electrodes are electrically connected to the second conductive line, the first island electrodes extending along the second direction, the second island electrodes extending along the second direction, and the first island electrodes and the second island electrodes are alternately arranged along the first direction,
wherein a ratio of a time when a touch voltage is applied to the first electrode to a time when a common voltage is applied to the first electrode is 1:2 to 1:12, wherein first sub-pixels among the sub-pixels are overlapping with the touch electrode and not overlapping with the common electrode, second sub-pixels among the sub-pixels are overlapping with the common electrode and not overlapping with the touch electrode.

2. The touch panel according to claim 1, wherein the first island electrodes and the second island electrodes are equal in length along the second direction.

3. The touch panel according to claim 1, wherein the first island electrodes and the second island electrodes overlap the first conductive line, the first island electrodes and the second island electrodes overlap the second conductive line.

4. The touch panel according to claim 1, wherein the second electrode comprises a connecting portion extending along the first direction and a plurality of finger portions extending along the second direction, the finger portions are connected to the connecting portion, and the first island electrodes and the finger portions are alternately arranged along the first direction.

5. The touch panel according to claim 4, wherein the first island electrodes and the finger portions of the second electrode are overlapped with the first conductive line, and the connecting portion of the second electrode is overlapped with the second conductive line.

6. The touch panel according to claim 4, wherein an area of one of the finger portions vertically projected on the substrate is larger than an area of one of the first island electrodes vertically projected on the substrate.

7. The touch panel according to claim 1, further comprising:
a black matrix, overlapped with the data lines and the scan lines, and the second electrode is spaced apart from the first electrode by at least one gap, and the black matrix is overlapped with the at least one gap.

8. The touch panel according to claim 1, wherein a ratio of an area of the first electrode vertically projected on the substrate to an area of the second electrode vertically projected on the substrate is 2:8 to 8:2.

9. The touch panel according to claim 1, wherein the first electrode and the second electrode have the same thickness.

10. The touch panel according to claim 1, wherein the first electrode and the second electrode are on the same surface.

11. The touch panel according to claim 1, wherein the first electrode and the second electrode are the same material layer.

12. The touch panel according to claim 1, further comprising a plurality of the first electrodes and a plurality of the first conductive lines, wherein each of the first electrodes is electrically connected to one corresponding first conductive line.

13. The touch panel according to claim 1, further comprising a plurality of the second electrodes, wherein the second electrodes are electrically connected to the second conductive line.

14. A touch panel, comprising:
a substrate;
a plurality of scan lines and a plurality of data lines, disposed on the substrate;
a plurality of sub-pixels, disposed on the substrate, the sub-pixels arranged in a plurality of columns along a first direction, and the sub-pixels arranged in a plurality of rows along a second direction, and each of the sub-pixels comprising:
an active element, electrically connected to a corresponding scan line and a corresponding data line; and
a pixel electrode, electrically connected to the active element;
a first conductive line, disposed on the substrate;
a second conductive line, disposed on the substrate; and
a conductive layer overlapping the sub-pixels, wherein the conductive layer comprises:
a first electrode, electrically connected to the first conductive line; and
a second electrode, electrically connected to the second conductive line, and the second electrode separated from the first electrode, wherein the first electrode is a touch electrode, and the second electrode is a common electrode,
wherein the first electrode comprises a plurality of first island electrodes separated from each other, and the plurality of the first island electrodes are electrically connected to the first conductive line,
wherein the second electrode comprises a connecting portion extending along the first direction and a plurality of finger portions extending along the second direction, the finger portions are connected to the connecting portion, and the first island electrodes and the finger portions are alternately arranged along the first direction,
wherein the connecting portion does not overlap with the first island electrodes,
wherein a ratio of a time when a touch voltage is applied to the first electrode to a time when a common voltage is applied to the first electrode is 1:2 to 1:12, wherein first sub-pixels among the sub-pixels are overlapping with the touch electrode and not overlapping with the common electrode, second sub-pixels among the sub-pixels are overlapping with the common electrode and not overlapping with the touch electrode.

15. The touch panel according to claim 14, wherein an area of one of the finger portions vertically projected on the substrate is larger than an area of one of the first island electrodes vertically projected on the substrate.

* * * * *